United States Patent [19]
Heinert

[11] 3,728,369
[45] Apr. 17, 1973

[54] STABILIZATION OF VINYL ISOCYANATES
[75] Inventor: Dietrich H. Heinert, Midland, Mich.
[73] Assignee: The Dow Chemical Company, Midland, Mich.
[22] Filed: Nov. 7, 1969
[21] Appl. No.: 874,981

[52] U.S. Cl.............................................260/453 SP
[51] Int. Cl..............................................C07c 119/04
[58] Field of Search.................260/453 AL, 453 SP

[56] References Cited

UNITED STATES PATENTS 3,551,468  12/1970  Chadwick............................260/453
3,535,359  10/1970  Chadwick............................260/453

OTHER PUBLICATIONS

Wagner and Zook: Syn. Org. Chem., pp. 261–262, John Wiley & Sons (1953).

Primary Examiner—Lewis Gotts
Assistant Examiner—Dolph H. Torrence
Attorney—Griswold and Burdick and C. E. Rehberg

[57] ABSTRACT

Vinyl-type isocyanates, such as vinyl, isopropenyl, styryl, and vinylphenyl isocyanates, are stabilized by acidified lower aliphatic dialkyl ketals, such as 2,2-dimethoxypropane and -butane and 2,2-diethoxypropane. Such ketals inhibit discoloration and/or formation of solids.

9 Claims, No Drawings

STABILIZATION OF VINYL ISOCYANATES

BACKGROUND OF THE INVENTION

This invention relates to additives for the stabilization of vinyl isocyanates and to the products thus stabilized.

Isocyanates are extremely reactive toward water or other materials containing active hydrogen and are also very easily oxidized, polymerized and otherwise modified or degraded. The vinyl isocyanates are much more sensitive to these various degrading influences than are the ordinary alkyl, alkylene or arylene isocyanates. Accordingly, the problem of stabilizing the vinyl isocyanates is a particularly difficult one in that many stabilizers that are effective and satisfactory in the ordinary isocyanates do not satisfactorily stabilize the vinyl isocyanates.

Aliphatic ketals, particularly 2,2-dimethoxypropane (hereinafter DMP) are known to be moisture scavengers and have been used as stabilizers in polyurethane formulations containing isocyanate groups (U.S. Pat. No. 3,376,252). They have also been used to remove moisture from fillers to be used in making filled polyurethane resins (Application of K. E. Hinze and L. E. Peterson, Ser. No. 839,671, filed July 7, 1969). Although DMP is effective when used alone in the above applications, it is ineffective in stabilizing vinyl isocyanates.

SUMMARY OF THE INVENTION

It has now been found that vinyl isocyanates are stabilized by incorporation therein of (1) 2,2-dimethoxypropane (DMP), 2,2-dimethoxybutane, 2,2-diethoxypropane, 3,3-di-n-butoxypentane, or similar lower dialkyl aliphatic ketals and (2) a catalytic amount of a strong acid that effectively catalyzes the hydrolysis of DMP.

The preferred ketals are those having the formula R—C(OR')$_2$—R'' wherein each of R, R' and R'' independently is lower alkyl; i.e., alkyl of one to four carbon atoms. Most preferred are those ketals containing a total of not more than seven carbon atoms.

The amount of ketal needed for stabilization depends largely on the water content of the isocyanate, including any water that might be picked up in handling and storing the material, and should include a suitable safety margin. Theoretically, one mole of ketal should remove one mole of water. While the ketal-water reaction is normally reversible, and goes only to 92 percent completion at 30°C. when reacted in a 1:1 molar ratio in the absence of other materials, I have found, unexpectedly, that they react essentially quantitatively in the presence of the vinyl isocyanates. Accordingly, a molar ratio of about 1.5:1, based on the actual or expected water content of the isocyanate, ordinarily provides adequate protection. When normal precautions to exclude water are taken, the water content will usually be of the order of 0.1%. For such material, about 0.3 – 0.5 percent by wt., based on vinyl isocyanate, is usually quite adequate. Since the ketals are inexpensive and readily available, and their presence in the isocyanate is ordinarily unobjectionable, larger amounts, up to 5 percent or more, may be used without raising any problems, thus providing additional protection in case of unforeseen contamination with water.

The acid catalyst to be used in the practice of the invention may be any acid that catalyzes the reaction of the vinyl isocyanate with water without itself having a deleterious effect on the isocyanate. Such acids include the hydrogen halides (HCl, HBr or HF), BF$_3$, and the strong organic acids, such as trichloroacetic acid, trifluoroacetic acid, formic acid, monochloroacetic acid, difluoroacetic acid, p-toluene sulfonic acid, methane sulfonic acid, pyridinium hydrochloride, etc. Such catalysts should, of course, be essentially anhydrous. Organic acid halides, e.g., acetyl chloride, chloroacetyl chloride, trifluoroacetyl chloride, p-toluene sulfonyl chloride and the like are also effective catalysts and are included in the term "acid catalyst" as used herein.

The amount of catalyst required depends on the particular materials used but in any case is a small catalytic amount. When using the preferred catalysts, trifluoroacetic acid, HCl or acetyl chloride, with DMP, about 0.005 to 0.1 moles of catalyst per liter of isocyanate is suitable, the preferred concentration being about 0.02 to 0.06 moles per liter.

SPECIFIC EMBODIMENTS OF THE INVENTION

The following examples illustrate the practice of the invention.

EXAMPLE 1

In the production of vinyl isocyanate by the method disclosed in my U.S. Pat. No. 3,470,228, the reactor effluent, after passing through stripper condensers at room temperature and at −46°C. to remove uncracked trivinyl isocyanurate and other materials of low volatility, was passed into a trap in a bath of liquid N$_2$ (−196° C.). This trap was precharged with 10 g. of m-dinitrobenzene, 47.8 ml. of DMP and 2.22 ml. of trifluoroacetic acid. This trap was connected in turn, through a manifold, to a second trap, similarly cooled, charged with 10 g. of m-dinitrobenzene. A third and final trap connected to the manifold was charged with 4.8 ml. of DMP and 0.3 ml. of trifluoroacetic acid. This trap was initially isolated from the manifold by a closed valve. The function of the dinitrobenzene in these traps was to inhibit polymerization of the vinyl isocyanate through the vinyl group, though it was observed in preliminary runs that this inhibitor alone did not completely prevent polymerization of the crude product. Since water is known to initiate polymerization of the material through the isocyanate group, the DMP and acid catalyst were used to prevent such polymerization. It has been found that even the traces of moisture absorbed on the surfaces of the equipment and containers are sufficient to cause gradual polymerization of even highly purified vinyl isocyanate.

During the reaction, the pressure at the reactor inlet was maintained at about 5.4 mm., this requiring a pressure of about 1.5 mm. at the outlet of the last trap.

When the reaction was completed, the manifold and traps were isolated by closing inlet and outlet valves, thus maintaining a pressure of about 1 mm. therein. The cooling bath was then removed from the second cold trap, thus causing the trap to become warm and distilling volatile materials from the second to the first trap. The cooling bath was then removed from the latter and the contents allowed to warm gradually, the pressure then also rising gradually. At atmospheric pressure the system was vented to the atmosphere. At about −15°C., a reaction began between the vinyl isocyanate and by-product HCN. To complete this reaction, the crude product was distilled from the first to the second trap by cooling the latter with liquid N₂ while allowing the former to warm and then repeating the distillation, this time into the third trap. The product thus obtained was clear, colorless, essentially pure vinyl isocyanate. After being stored in a refrigerator for 34 days it was unchanged in appearance and purity. Upon distillation at atmospheric pressure through a 12 inch Vigreux column it still remained unchanged.

When the above experiment was repeated with omission of the DMP and trifluoroacetic acid, the product became turbid after a day or two and within one month over 20% of it had polymerized. When the nonpolymerized portion was distilled, the distillate polymerized almost completely within one day.

EXAMPLE 2

To 50 ml. of pure vinyl isocyanate was added 0.5 ml. of DMP, 0.225 ml. of trifluoroacetic acid and lastly, 0.05 ml. of water. It was analyzed at intervals by gas chromatography. The analysis before addition of the water showed 0.00 percent water. Five minutes after addition of water it again analyzed 0.00 percent water. Upon distillation, the distillate remained clear and stable after 3 hr. at room temperature.

In a control experiment identical with that above except that the DMP and trifluoroacetic acid were omitted, analyses 5 min. and 30 min. after the addition of the water showed 0.1 and 0.05 percent water, respectively and distillation yielded a distillate that became turbid within 30 min. at room temperature.

EXAMPLE 3

To determine the effectiveness of DMP in inactivating larger amounts of water and to compare different acid catalysts, three parallel experiments were run.

Into each of three flasks fitted with stirrers and reflux condensers was placed 50 ml. of pure vinyl isocyanate. Into the first and second flasks was also put 5 ml. of DMP. Into the first was also put 0.25 ml. of trifluoroacetic acid. Into the second was put 90 ml. (STP) of gaseous anhydrous HCl. Then, into each flask was put 0.5 ml. of water (1 percent by vol.). The first and second flasks became slightly warm, due to the reaction of the isocyanate with the methanol released from the DMP and a small, fluffy precipitate formed in the first. The second remained clear and colorless. A massive precipitate in the third flask solidified to the point that the stirrer was stalled.

After 4 days the material in the three flasks was distilled to recover any remaining vinyl isocyanate and to determine the stability of the distillate thus obtained. Results are shown in the following table.

| Flask No. | Monomer Recovered, % | Stability of Distillate |
|---|---|---|
| 1 | 86 | Slight turbidity after 1 day |
| 2 | 85 | Clear and colorless after 1 month |
| 3 | 64 | Polymerized immediately and completely |

EXAMPLE 4

Two glass bottles were oven-dried at 110°C. One of the bottles and a metal can were then soaked 30 min. in a solution of 50 ml. of DMP and 2.5 ml. of trifluoroacetic acid in 1 liter of trichloroethylene and then drained. The three containers, all protected from atmospheric moisture in a dry-box, were then filled with pure, unstabilized vinyl isocyanate and tightly closed. After storage for 40 days at room temperature, the three samples were distilled to determine extent of polymerization and stability of the distillate. Results are shown in the following table.

| Container | Monomer Recovered, % | Stability of Distillate |
|---|---|---|
| Oven-dried glass | 94.0 | Turbid after 2 hrs. |
| Treated glass | 97.6 | Clear after 24 hrs. |
| Treated metal can | 97.8 | Clear after 24 hrs. |

Results similar to those described above are obtained with other vinyl isocyanates, such as isopropenyl, styryl or vinylphenyl isocyanate, and with other aliphatic dimethyl ketals, such as 2,2-dimethoxybutane or 3,3-dimethoxypentane.

I claim:

1. The process of stabilizing vinyl isocyanate, isopropenyl isocyanate, styryl isocyanate or vinylphenyl isocyanate comprising maintaining therein a stabilizing amount of ketal of the formula R—C(OR')₂—R'' wherein R, R' and R'' are lower alkyl groups and a catalytic amount of a substantially anhydrous acid catalyst that catalyzes the reaction of water with said ketal and is free of deleterious effect on the isocyanate.

2. The process of claim 1 wherein the isocyanate is vinyl isocyanate.

3. The process of claim 1 wherein the ketal is 2,2-dimethoxypropane.

4. The process of claim 1 wherein the catalyst is trifluoroacetic acid, acetyl chloride or hydrogen chloride.

5. Vinyl isocyanate, isopropenyl isocyanate, styryl isocyanate or vinylphenyl isocyanate containing a stabilizing amount of a ketal of the formula R—C(OR')₂—R'' wherein R, R' and R'' are lower alkyl groups and a catalytic amount of a substantially anhydrous acid catalyst that is effective to catalyze the reaction of water with said ketal and is free of deleterious effect on the isocyanate.

6. The composition of claim 5 wherein the isocyanate is vinyl isocyanate.

7. The composition of claim 5 wherein the ketal is 2,2-dimethoxypropane.

8. The composition of claim 5 wherein the catalyst is trifluoroacetic acid, acetyl chloride or hydrogen chloride.

9. The composition of claim 5 wherein the isocyanate is vinyl isocyanate, the ketal is 2,2-dimethoxypropane and the catalyst is trifluoroacetic acid.

* * * * *